US012692124B2

(12) United States Patent
Fauconnet et al.

(10) Patent No.: US 12,692,124 B2
(45) Date of Patent: Jul. 28, 2026

(54) ELEVATOR CAR ASSEMBLY

(71) Applicant: Otis Elevator Company, Farmington, CT (US)

(72) Inventors: Aurelien Fauconnet, Isdes (FR); Vincent Lopez, Gien (FR); Bi Xiong, Châtillon-sur-Loire (FR); Fabrice Boniface, Châtillon sur Loire (FR); Thibault Anquez, Gien (FR)

(73) Assignee: OTIS ELEVATOR COMPANY, Farmington, CT (US)

( * ) Notice: Subject to any disclaimer, the term of this patent is extended or adjusted under 35 U.S.C. 154(b) by 931 days.

(21) Appl. No.: 17/984,764

(22) Filed: Nov. 10, 2022

(65) Prior Publication Data

US 2023/0373752 A1 Nov. 23, 2023

(30) Foreign Application Priority Data

May 19, 2022 (EP) .................................... 22305738

(51) Int. Cl.

*B66B 1/50* (2006.01)
*B66B 1/46* (2006.01)
*B66B 11/02* (2006.01)
*H01R 13/74* (2006.01)

(52) U.S. Cl.

CPC ................ *B66B 1/50* (2013.01); *B66B 1/467* (2013.01); *B66B 11/0226* (2013.01); *H01R 13/74* (2013.01); *B66B 2201/4623* (2013.01)

(58) Field of Classification Search

CPC ....... B66B 1/50; B66B 1/467; B66B 11/0226; B66B 2201/4623; B66B 1/466; B66B 11/0025; H01R 13/74

See application file for complete search history.

(56) References Cited

U.S. PATENT DOCUMENTS 5,829,554 A 11/1998 Benson et al.
5,862,889 A * 1/1999 Sevilleja ............ B66B 11/0233 187/395

(Continued)

FOREIGN PATENT DOCUMENTS

CN 107130867 A 9/2017
CN 110155844 A 8/2019

(Continued)

OTHER PUBLICATIONS

European Search Report for application EP 22305738.1, dated Oct. 20, 2022, 30 pages.
Chinese Office Action for Application No. 202211455313.7, Issued Nov. 25, 2025, 9 Pages.

*Primary Examiner* — Bickey Dhakal

(74) *Attorney, Agent, or Firm* — CANTOR COLBURN LLP

(57) ABSTRACT

An elevator car assembly (100). The elevator car assembly (100) includes: an elevator car operating panel (106) including a user interface (124) on a front surface (108) and a first connector portion (112) on a rear surface (110); and an elevator cab (102) including a plurality of elevator cab walls (104) including at least one elevator cab wall (104) for mounting the elevator car operating panel (106) thereon, the at least one elevator cab wall (104) including a second connector portion (114). The first connector portion (112) is configured to form a releasable electrical connection with the second connector portion (114).

13 Claims, 9 Drawing Sheets

(56) References Cited

U.S. PATENT DOCUMENTS

| | | | | |
|---|---|---|---|---|
| 6,029,778 | A * | 2/2000 | Lacarte Estallo ....... B66B 11/02 187/395 |
| 6,227,335 | B1 * | 5/2001 | Koeppe, Jr. ............ B66B 1/462 187/395 |
| 6,446,396 | B1 * | 9/2002 | Marangoni ........... E04B 2/7453 108/50.02 |
| 6,845,850 | B1 | 1/2005 | Schneck |
| 7,118,402 | B2 | 10/2006 | Takada |
| 2006/0168855 | A1 | 8/2006 | D'Urban Jackson |
| 2017/0240384 | A1 * | 8/2017 | Hu ...................... B66B 11/0246 |
| 2018/0037440 | A1 * | 2/2018 | Blondel .............. B66B 11/0233 |
| 2018/0297817 | A1 | 10/2018 | Fernandez et al. |

FOREIGN PATENT DOCUMENTS

| | | | |
|---|---|---|---|
| CN | 110831879 | A | 2/2020 |
| CN | 211078057 | U | 7/2020 |
| CN | 212863662 | U | 4/2021 |
| CN | 213141045 | U | 5/2021 |
| CN | 215101301 | U | 12/2021 |
| EP | 0349125 | A2 | 1/1990 |
| EP | 0570142 | A1 | 9/1996 |
| EP | 1422181 | A1 | 5/2004 |
| EP | 1471606 | A2 | 10/2004 |
| JP | 2006290573 | A | 10/2006 |
| JP | 2015218028 | A | 12/2015 |
| KR | 20010027216 | A | 4/2001 |
| KR | 20140142489 | A | 12/2014 |
| KR | 20150002172 | U | 6/2015 |

* cited by examiner

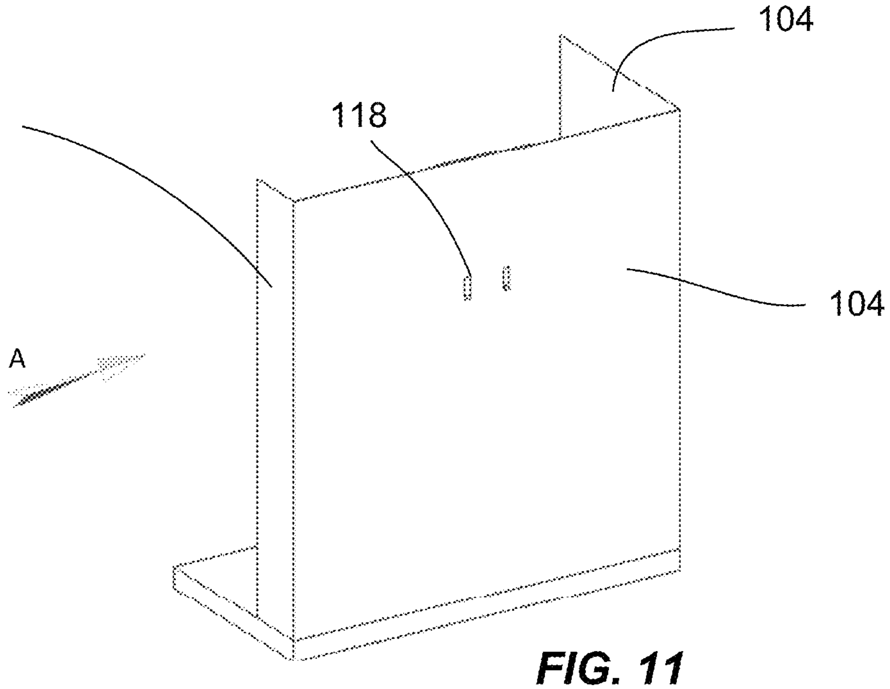
*FIG. 11*
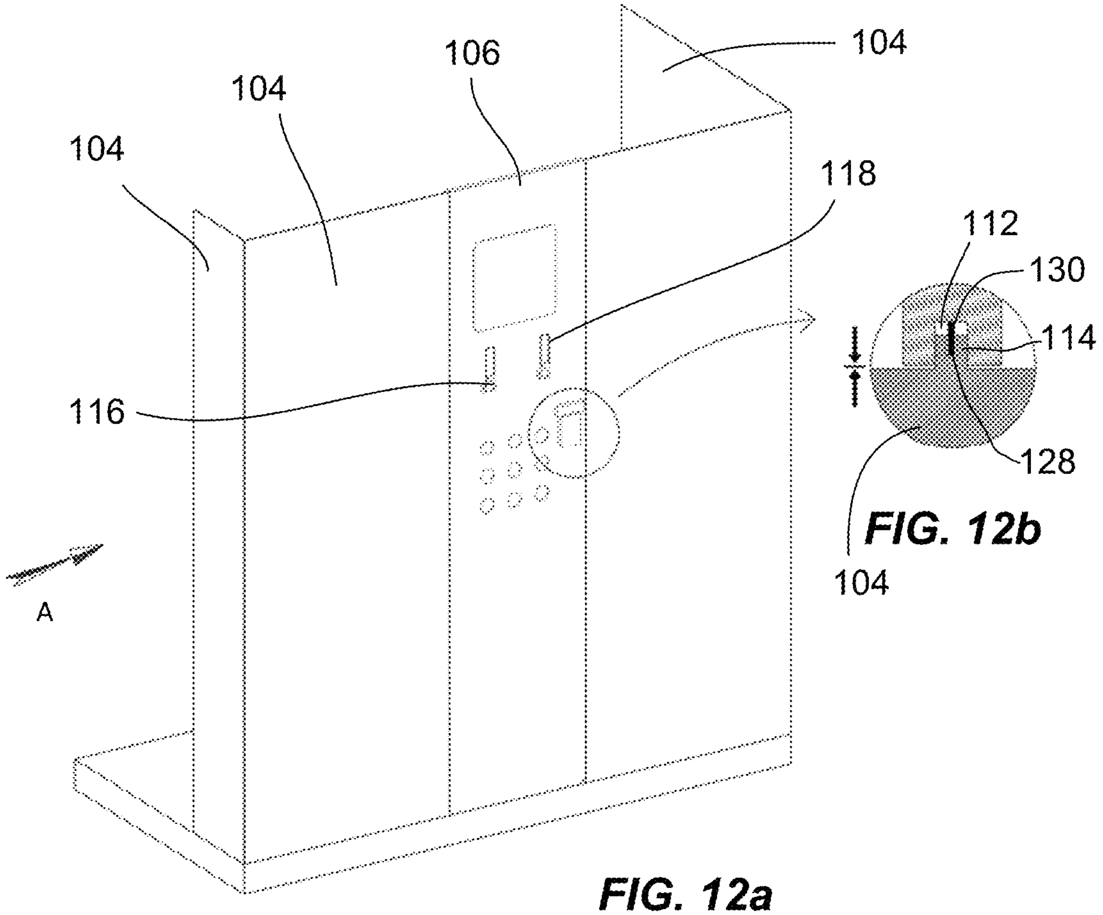
*FIG. 12b*
*FIG. 12a*

ELEVATOR CAR ASSEMBLY

FOREIGN PRIORITY

This application claims priority to European Patent Application No. 22305738.1, filed May 19, 2022, and all the benefits accruing therefrom under 35 U.S.C. § 119, the contents of which in its entirety are herein incorporated by reference.

TECHNICAL FIELD

This disclosure relates to an elevator car operating panel, an elevator cab and an elevator car assembly including an elevator cab and an elevator car operating panel.

BACKGROUND

Elevator cars generally include an elevator car operating panel ("COP"), which is provided inside the elevator car. The COP may include various electronic components, for example buttons for selecting a desired landing floor, a display screen, an emergency stop switch, an alarm button, door open and close buttons and maintenance switches.

Each of the electronic components generally require manual wiring between the COP and a junction box, which is typically situated on top of the elevator car. This manual wiring leads to complex maintenance procedures that are difficult to carry out in situ. Furthermore, it is difficult and time consuming to update the COP, for example to add additional features, replace existing components, or provide an aesthetic update, and such updates often require a complete replacement of the elevator car enclosure, which can be costly.

The elevator car operating panel and elevator car assembly according to the present disclosure seeks to address one or more of these shortcomings.

SUMMARY

According to a first aspect of this disclosure there is provided an elevator car assembly comprising: an elevator car operating panel comprising a user interface on a front surface and a first connector portion on a rear surface; and an elevator cab comprising a plurality of walls comprising at least one elevator cab wall for mounting the elevator car operating panel thereon, the at least one elevator cab wall comprising a second connector portion; wherein the first connector portion is configured to form a releasable electrical connection with the second connector portion.

Optionally, one of the first and second connector portion is a male connector portion and the other of the first and second connector portion is a female connector portion.

Optionally, the first connector portion is configured for insertion into the second connector portion.

Optionally, the first connector portion comprises at least one pin contact and the second connector portion comprises at least one receptacle contact configured to cooperate with the at least one pin contact.

Optionally, the first connector portion comprises at least one receptacle contact and the second connector portion comprises at least one pin contact configured to cooperate with the at least one receptacle contact.

Optionally, the first connector portion and the second connector portion are configured to push fit together.

Optionally, the first connector portion is further configured to form a releasable data connection with the second connector portion.

Optionally, the elevator car operating panel comprises a printed circuit board between the front surface and the rear surface, and the first connector portion is electrically coupled to the printed circuit board.

Optionally, the second connector portion is electrically coupled to circuitry on the elevator cab.

Optionally, the elevator car operating panel is configured for releasably mounting onto the at least one elevator cab wall.

Optionally, the elevator car operating panel comprises a mechanical coupling configured to releasably couple with a corresponding coupling on the at least one elevator cab wall.

Optionally, the mechanical coupling comprises a first part of a hinge mechanism, and the corresponding coupling comprises a second part of a hinge mechanism, wherein the first part of the hinge mechanism is configured to cooperate with the second part of the hinge mechanism such that the elevator car operating panel hinges with respect to the at least one elevator cab wall.

Optionally, the elevator car assembly further comprises at least one securing element configured to secure the elevator car operating panel in a mounted position with respect to the at least one elevator cab wall.

Optionally, the user interface comprises at least one elevator control comprising at least one of a switch, a button, and a display, each accessible through or disposed upon the front surface of the elevator car operating panel.

According to a second aspect of this disclosure, there is provided an elevator cab comprising: a plurality of elevator cab walls comprising at least one elevator cab wall for mounting an elevator car operating panel thereon, the at least one elevator cab wall comprising a second connector portion; wherein the second connector portion is configured to form a releasable electrical connection with a first connector portion provided on a rear surface of the elevator car operating panel.

According to a third aspect of this disclosure, there is provided an elevator car operating panel comprising: a user interface on a front surface of the elevator car operating panel and a first connector portion on a rear surface of the elevator car operating panel; wherein the first connector portion is configured to form a releasable electrical connection with a second connector portion provided on at least one wall of an elevator cab.

Various examples described herein advantageously provide an elevator car operating panel that is simple to install and easy to replace compared to existing elevator car operating panels.

BRIEF DESCRIPTION OF THE DRAWINGS

Some examples of this disclosure will now be described, by way of example only, with reference to the accompanying drawings, in which:

FIG. 11 shows an exterior view of another example of an elevator cab;

FIG. 12*a* shows the elevator cab of FIG. 11 with an elevator car operating panel installed;

FIG. 12*b* shows a detailed view of the electrical coupling of FIG. 12*a*.

In the drawings, like reference numerals refer to like parts.

DETAILED DESCRIPTION

Figure 1:
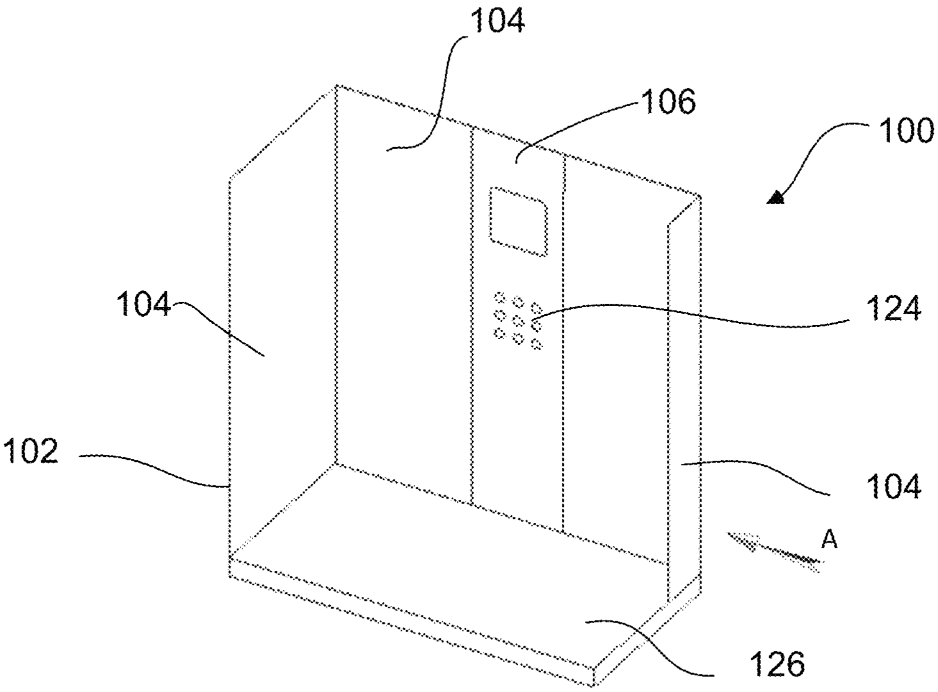
FIG. 1 shows an elevator car assembly.

FIG. 1 illustrates an elevator car assembly 100. The elevator car assembly 100 includes an elevator cab 102 including a plurality of walls 104. For illustration purposes, the elevator cab 102 of FIG. 1 is shown with an open side, though it will be appreciated that the elevator cab 102 will generally include a further wall and elevator doors for access into the elevator cab 102. For example, access to the elevator cab 102 may be provided in the direction of the arrow A through sliding doors provided in place of at least part of the elevator cab wall 104.

The elevator car assembly 100 further includes an elevator car operating panel 106, which is mounted onto one of the plurality of elevator cab walls 104. The elevator car operating panel 106 includes a user interface 124, which may include various elevator controls. The elevator controls may, for example, include buttons to select a destination floor, maintenance switches, and a display which may display information to the user such as a selected destination floor, a current position floor, and a direction of movement of the elevator car assembly 100.

In this example, the elevator car operating panel 106 is sized to extend over a portion of one of the plurality of elevator cab walls 104, extending from a floor 126 of the elevator cab 102 to a ceiling of the elevator cab 102. In other examples, the elevator car operating panel 106 may be sized to extend over the entirety of the width of the elevator cab wall 104. In other examples, such as that shown in FIG. 2, the elevator car operating panel 106 may be configured to extend over a portion of the height and width of the elevator cab wall 104. It will be appreciated that the elevator car operating panel 106 may be configured with a different size and shape according to the number and type of elevator controls included on the elevator car operating panel 106 and the aesthetic requirements of the elevator cab 102.

Figure 3:
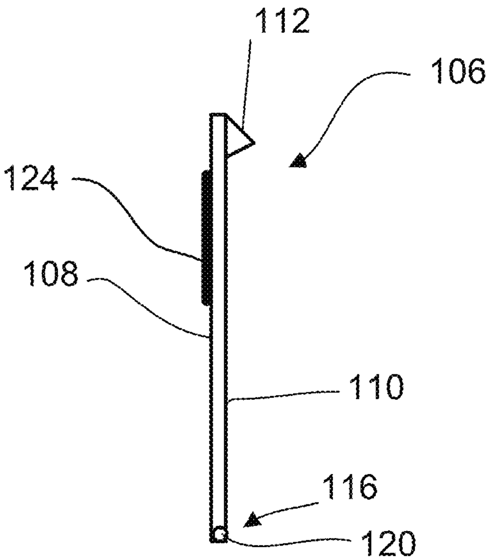
FIG. 3 shows a sectional side view of an elevator car operating panel.
Figure 4:
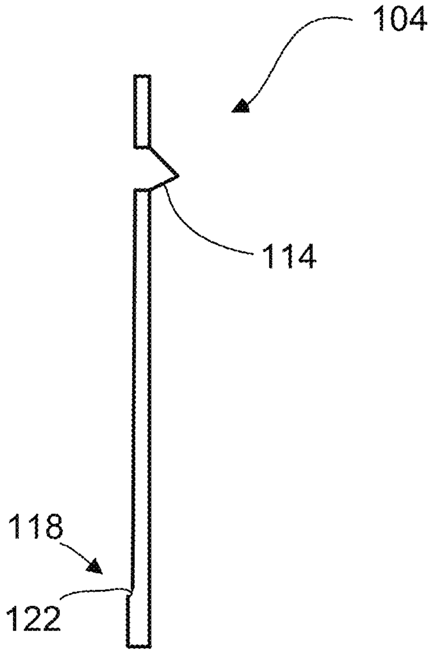
FIG. 4 shows a sectional side view of an elevator cab wall.

FIGS. 3 and 4 respectively show schematic views of a sectional side view of an elevator car operating panel 106 and an elevator cab wall 104 to which it is mounted. The elevator car operating panel 106 includes a front surface 108 and a rear surface 110. The user interface 124 is provided on the front surface 108 such that each of the elevator controls may be accessible through or disposed upon the front surface 108 of the elevator car operating panel 106. The elevator car operating panel 106 further includes a first connector portion 112 provided on the rear surface 110.

The elevator cab wall 104, onto which the elevator car operating panel 106 is mounted, includes a second connector portion 114. The first connector portion 112 is configured to form a releasable electrical connection with the second connector portion 114. That is, the first connector portion 112 is configured to cooperate with the second connector portion 114 to form the releasable electrical connection.

The elevator control panel 106 may include a printed circuit board between the front surface 108 and the rear surface 110. The first connector portion 112 may be electrically coupled to the printed circuit board. In one example, the first connector portion 112 may be a male connector soldered onto the printed circuit board. The second connector portion 114 is electrically coupled to circuitry on or in the elevator cab 102. In one example the second connector portion 114 may be a female wire connector configured to connect with wires on or in the elevator cab 102.

In some examples the first connector portion 112 and second connector portion 114 are further configured to form a data connection for transfer of data. This may be utilised for communication of the elevator car operating panel 106 with an elevator controller, for example. In other examples, a third connector portion may be provided on the elevator car operating panel 106 and a fourth connector portion may be provided on the elevator cab wall 104. The third and fourth connector portions may be configured to cooperate to form a dedicated data connection that is independent of the electrical connection. This may be advantageous as a separate data connection may provide higher speed data transfer. It will be appreciated that the third and fourth connector portions may be configured similarly to the first and second connector portions 112, 114 as described in more detail below.

One of the first and second connector portion 112, 114 may be a male connector portion and the other of the first and second connector portion 112, 114 may be a female connector portion.

In this example, the first connector portion 112 is a male connector portion and the second connector portion 114 is a female connector portion. In other examples, the first connector portion 112 may be a female connector portion and the second connector portion 114 may be a male connector portion.

The first connector portion 112 is configured such that it can be inserted or plugged into the second connector portion 114 to form the electrical connection. The first connector portion 112 and the second connector portion 114 may be configured to form a push fit connection. In this way, during installation or maintenance it is possible to simply push together the first and second connector portions 112, 114 to form the electrical connection, and pull them apart to release the electrical connection. As such, this mitigates the need for any tooling to electrically connect or disconnect the elevator car operating panel 106 with the elevator cab wall 104.

In one example the first connector portion 112 may include a plurality of pin contacts and the second connector portion 114 may include a plurality of receptacle contacts configured to cooperate with the plurality of pin contacts. The pin contacts are configured to be slidably received in the receptacle contacts such that a releasable electrical connection may be formed.

It will be appreciated by those skilled in the art that various connectors configured for transfer of power and/or data may be suitable for use as the first and second connector portions 112, 114. In some examples, standard connectors including HDMI, fibre, USB, or USB-C may be utilized. Alternatively, a custom connector designed specifically for the elevator car operating panel 106 may be utilised. In some examples, a connector configured to provide both electrical connection and data connection may be used. The first connector portion may include both electrical contacts and data contacts configured to engage with corresponding contacts on the second connector portion.

The elevator car operating panel 106 may further be configured for releasably mounting onto the elevator cab wall 104. For example, the elevator car operating panel 106 may include a mechanical coupling 116 configured to releasably couple with a corresponding coupling 118 on the elevator cab wall 104. In this way, the elevator car operating panel 106 can be relatively easily installed, removed and replaced.

In this example, the mechanical coupling 116 includes a first part of a hinge mechanism. In this example, the first part of the hinge mechanism is a hinge rod 120 positioned along a lower edge of the elevator car operating panel 106. The corresponding coupling 118 comprises a second part of the hinge mechanism. In this example, the second part of the hinge mechanism is a longitudinal groove or recess 122 configured to receive the hinge rod 120 of the first part of the hinge mechanism. The first part of the hinge mechanism is configured to cooperate with the second part of the hinge mechanism such that the elevator car operating panel 106 hinges with respect to the elevator cab wall 104. In this example, when the hinge rod 120 engages with the groove or recess 122, the elevator car operating panel 106 hinges about an axis of the hinge rod 120.

The elevator car assembly 100 may further include at least one securing element configured to secure the elevator car operating panel 106 to the elevator cab wall 104. The at least one securing element may include one or more screws, bolts, or locks. The screws, bolts or locks may be positioned distal from the mechanical coupling and may secure the elevator operating panel 106 to the elevator cab wall 104. The securing elements may aptly be configured to prevent unauthorised removal of the elevator car operating panel 106 from the elevator cab wall 104. For example, the securing elements may be tamper proof. For example, the securing elements may require a unique key or tooling to release the securing element and remove the elevator car operating panel 106 from the elevator cab wall 104.

Figure 2:
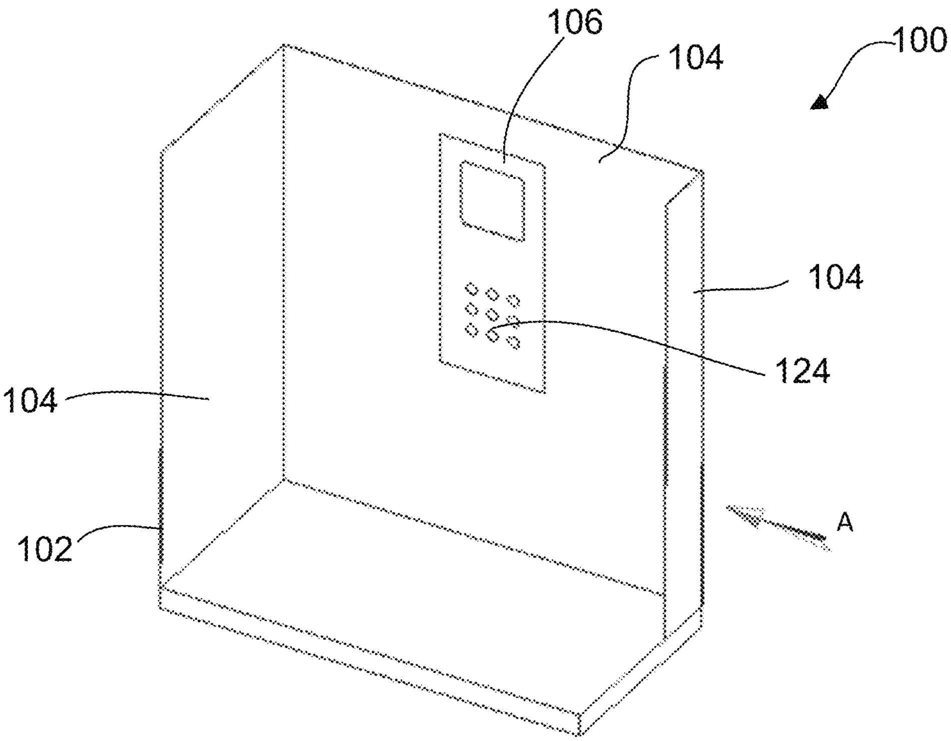
FIG. 2 shows a further example of an elevator car assembly.
Figures 5A, 5B, 5C, 5D:
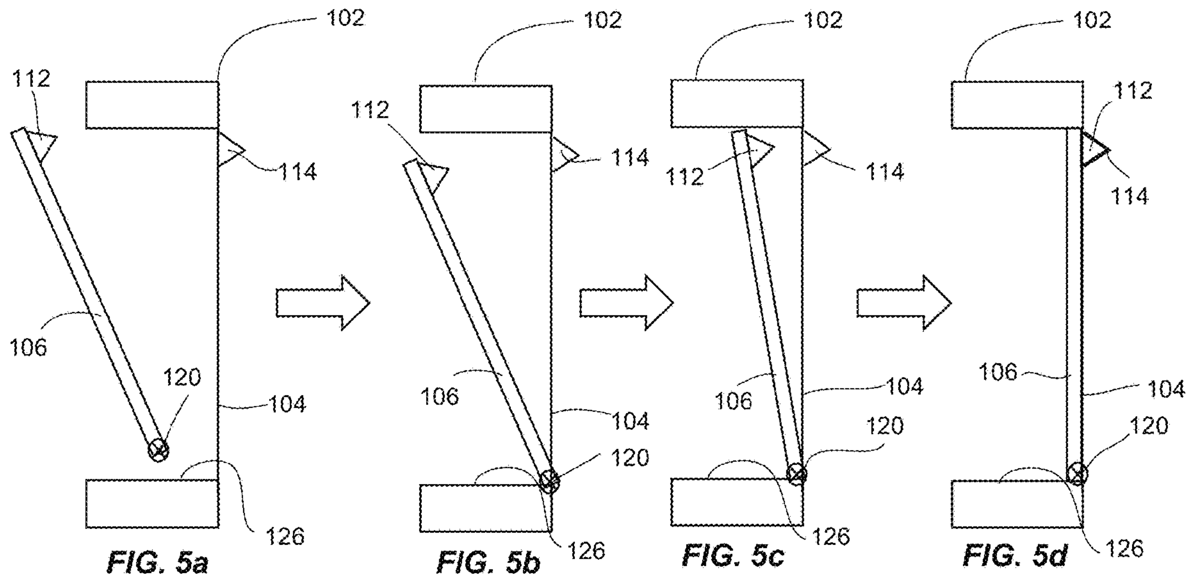
FIGS. 5*a* to 5*d* show steps for mounting the elevator car operating panel of FIG. 3 onto the elevator cab wall of FIG. 4.

Turning now to FIGS. 5*a* to 5*d*, there is shown steps for installing the elevator car operating panel 106 of FIGS. 1 and 2 in the elevator cab 102. In a first step, as shown in FIG. 5*a*, the elevator car operating panel 106 is positioned inside the elevator cab 102 with the rear surface 110 facing the elevator cab wall 104 that includes the second connector portion 114.

In a second step, as shown in FIG. 5*b*, the hinge rod 120 forming the first part of the hinge mechanism is coupled with the second part of the hinge mechanism in the elevator cab wall 104. In this example, the first part of the hinge mechanism is provided on a lower edge of the elevator car operating panel 106. As such, the lower edge of the elevator car operating panel 106 is coupled to the elevator cab wall 104 first via the hinge mechanism.

In a third step, as shown in FIG. 5*c*, the elevator car operating panel 106 is hinged with respect to the elevator cab wall 104, such that an upper edge of the elevator car operating panel 106 moves towards the elevator cab wall 104.

In a fourth step, the hinging of the elevator car operating panel 106 continues until the first connector portion 112 cooperates with the second connector portion 114 to form the electrical connection as shown in FIG. 5*d*. In this example, the first connector portion 112 is inserted into the second connector portion 114 as the elevator car operating panel 106 hinges closer to the elevator cab wall 104.

Figure 6A:
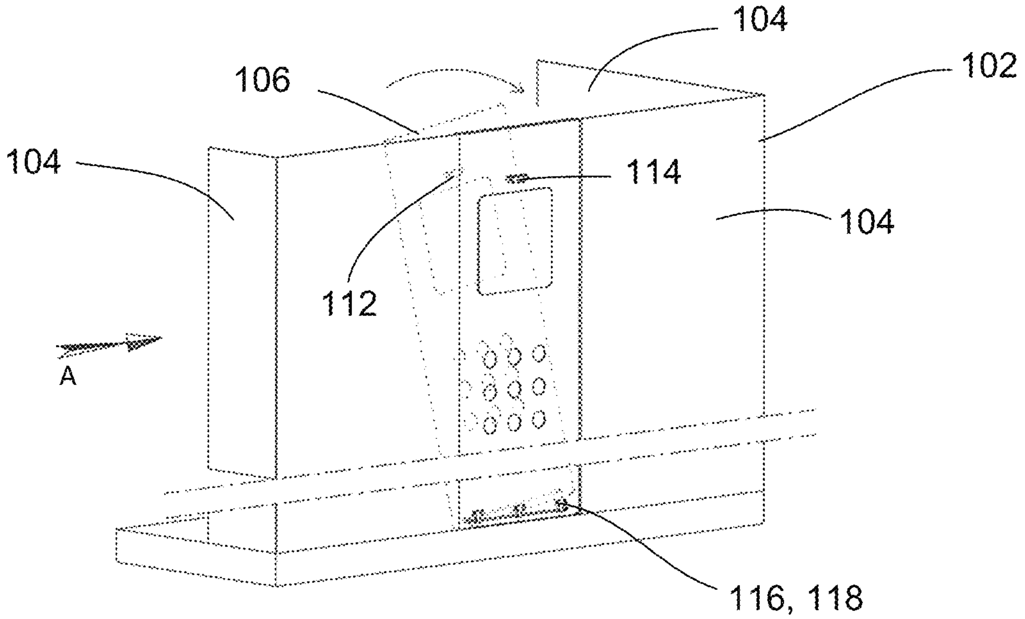
FIGS. 6*a* and 6*b* show an exterior view of another example of an elevator cab with an elevator car operating panel being installed.
Figure 6B:
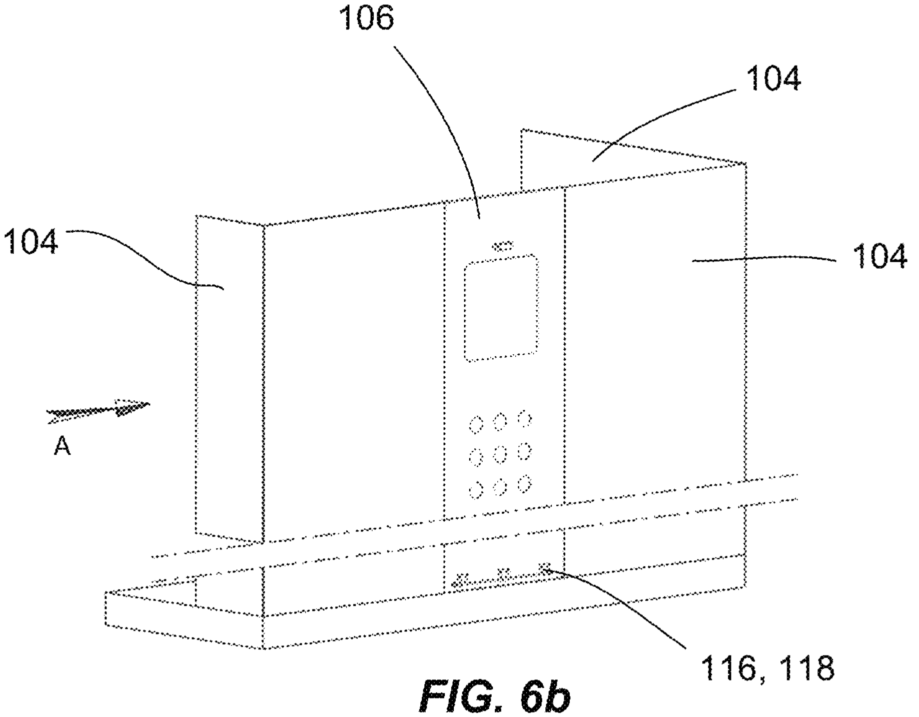

A similar hinging mechanism can also be seen in FIGS. 6*a* and 6*b*, which illustrate an external view of the elevator cab 102. In this example, the elevator cab wall 104, onto which the elevator car operating panel 106 is mounted, is shown in a translucent view, so that the elevator car operating panel 106 can be seen. However, it will be appreciated that the elevator cab wall 104 may be opaque and that the elevator car operating panel 106 may not be visible from the outside of the elevator cab 102.

In the example shown, the first connector portion 112 is provided at the upper edge of the elevator car operating panel 106, distal from the first part of the hinge mechanism. This may be advantageous in that it may enable the first connector portion 112 to more accurately align with the second connector portion 114. This is because at the point where the first and second connector portion 112, 114 contact during hinging of the elevator car operating panel 106, the elevator car operating panel 106 is close to vertical so that the first and second connector portions 112, 114 are almost axially aligned. This helps to enable easier insertion of first connector portion 112 into the second connector portion 114.

Figure 7:
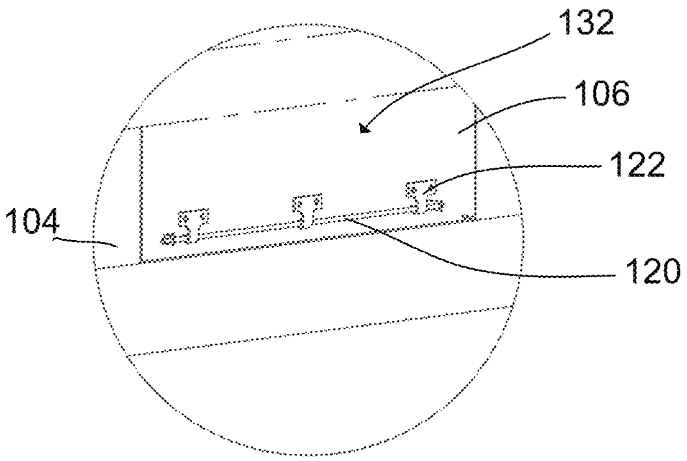
FIG. 7 shows a detailed view of the mechanical coupling of the example of FIGS. 6*a* and 6*b;*

FIG. 7 illustrates an example hinge mechanism 132 in further detail. As shown, the first part of the hinge mechanism 132 is a hinge rod 120, which is coupled to a rear surface of the elevator car operating panel 106, for example via coupling members provided at each end of the hinge rod 120.

The second part of the hinge mechanism 132 includes a plurality of hook portions 122. Each hook portion 122 includes a fixing part for fixing to the elevator cab wall 104, for example, via one or more screws, and a hook part that is configured to receive the hinge rod 120. The hook part may aptly be configured to be resilient such that the hinge rod may snap fit into the hook part. This may help with easier installation by securely locating the hinge rod 120 into the hook portions 122 before hinging the elevator car operating panel 106 into the final position.

Figure 8A:
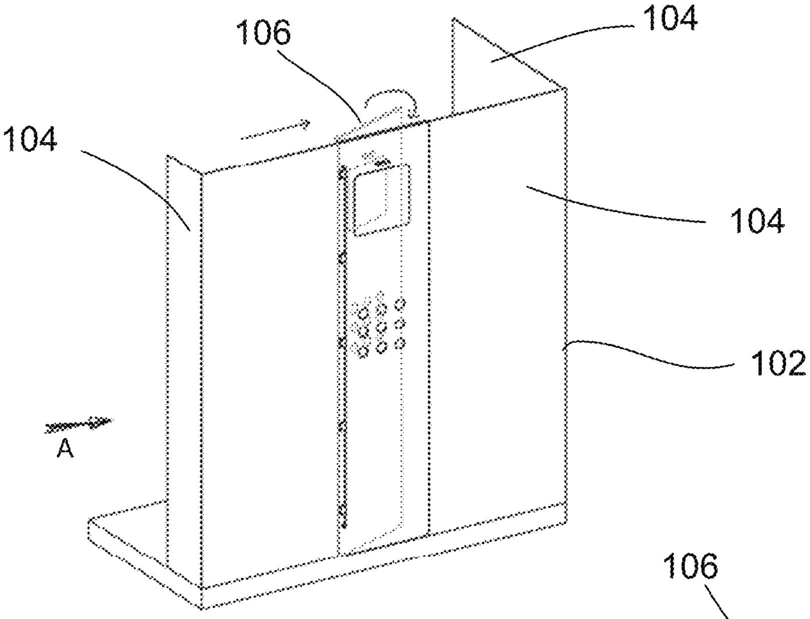
FIGS. 8*a* and 8*b* show an exterior view of yet another example of an elevator cab with an elevator car operating panel being installed.
Figure 8B:
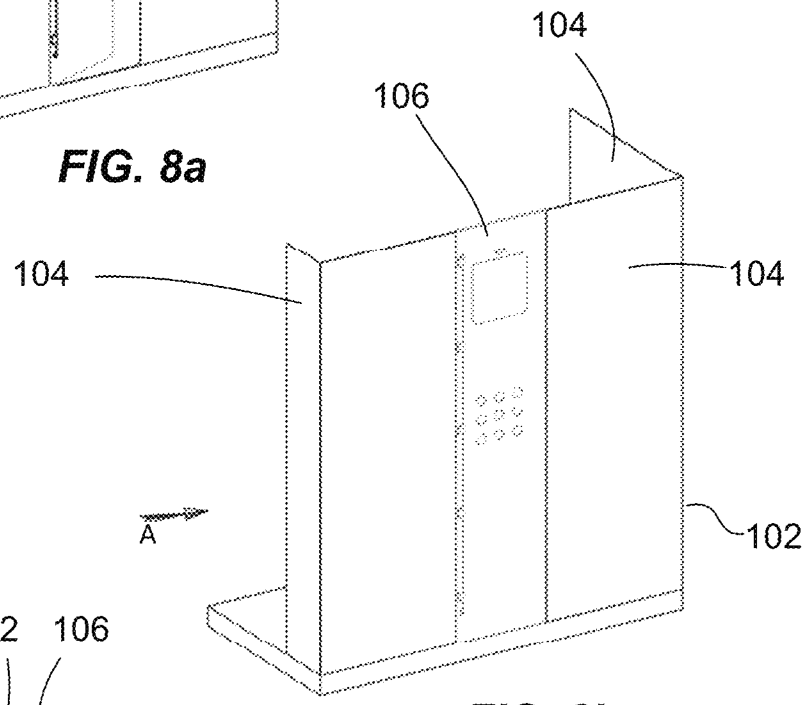
Figure 9:
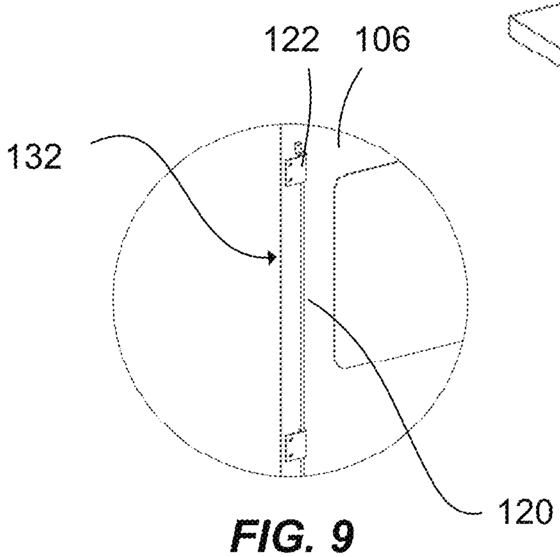
FIG. 9 shows a detailed view of the mechanical coupling of the example of FIGS. 8*a* and 8*b;*

Whilst the first part of the hinge mechanism 132 is shown on a lower edge of the elevator car operating panel 106 in the example of FIGS. 1 to 7, in other examples, the first part of the hinge mechanism 132 may be provided along any other edge of the elevator car operating panel 106. For example, the first part of the hinge mechanism 132 may be provided along one of the top, bottom and side edges of the elevator car operating panel 106. In the example shown in FIGS. 8*a*, 8*b* and 9, the hinge mechanism 132 is provided along a side edge of the elevator car operating panel 106. Apart from its position, the hinge mechanism 132 of FIGS. 8*a*, 8*b* and 9 is substantially identical to that already described with reference to FIG. 7 and will not be described again in detail.

Figure 10A:
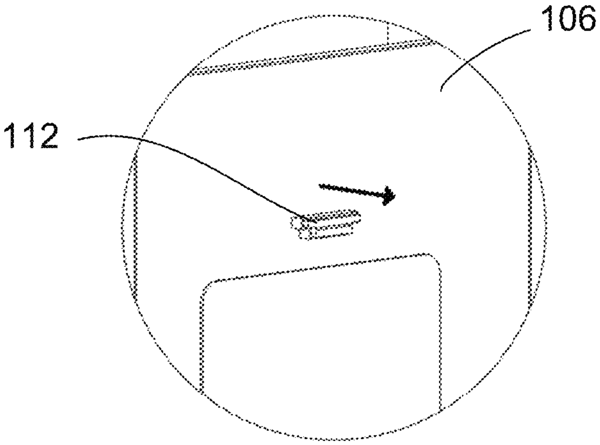
FIGS. 10*a* and 10*b* show a detailed view of the electrical coupling of the example of FIGS. 6*a* and 6*b* and FIGS. 8*a* and 8*b;*
Figure 10B:
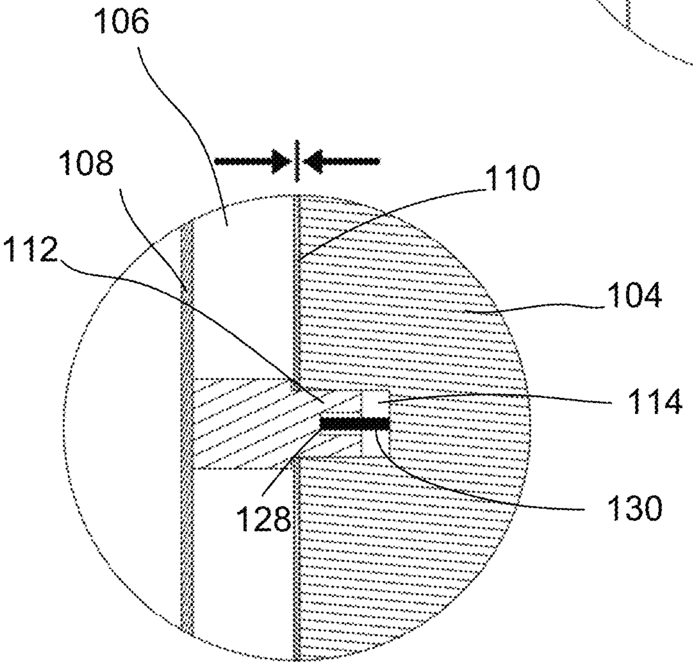

Referring now to FIGS. 10*a* and 10*b* there is illustrated a first connector portion 112 and second connector portion 114 in further detail. As shown, in this example, the first connector portion 112 is positioned on a rear surface 110 of the elevator car operating panel 106. The first connector portion 112 is a male connector portion and therefore extends outwardly from the rear surface 110 of the elevator car operating panel 106. The second connector portion 114 is provided in the elevator cab wall 104. The second connector portion 114 is a female connector portion 104 and in this example is recessed into the elevator cab wall 104.

The first connector portion 112 includes a receptacle contact 128 at an end distal from the rear surface 110 of the elevator car operating panel 106. The second connector portion 114 includes a pin contact 130 extending from a base of the recess of the second connector portion 114 partly towards the surface of the elevator cab wall 104. As the first connector portion 112 couples with the second connector portion 114, the male connector portion is inserted into the female connector portion and the receptacle contact 128 receives the pin contact 130 to form the electrical connection.

Whilst one receptacle contact 128 and one pin contact 130 are shown in the example of FIGS. 10*a* and 10*b*, it will be appreciated that the first connector portion 112 may include a plurality of receptacle contacts 128 and the second connector portion 114 may include a plurality of corresponding pin contacts 130. The pin contacts 130 may alternatively be provided as part of the first connector portion 112 (male connector portion) and the receptacle contacts 128 may be provided as part of the second connector portion 114 (female connector portion).

Referring now to FIGS. 11, 12*a* and 12*b*, there is shown an elevator car assembly including an elevator car operating panel 106 and elevator cab wall 104 with an alternative mechanical coupling 116, corresponding coupling 118, first connector portion 112, and second connector portion 114. The remaining elements of the example of FIGS. 11, 12*a* and 12*b* are substantially identical to those described previously and will not be described again in detail.

Figure 13A:
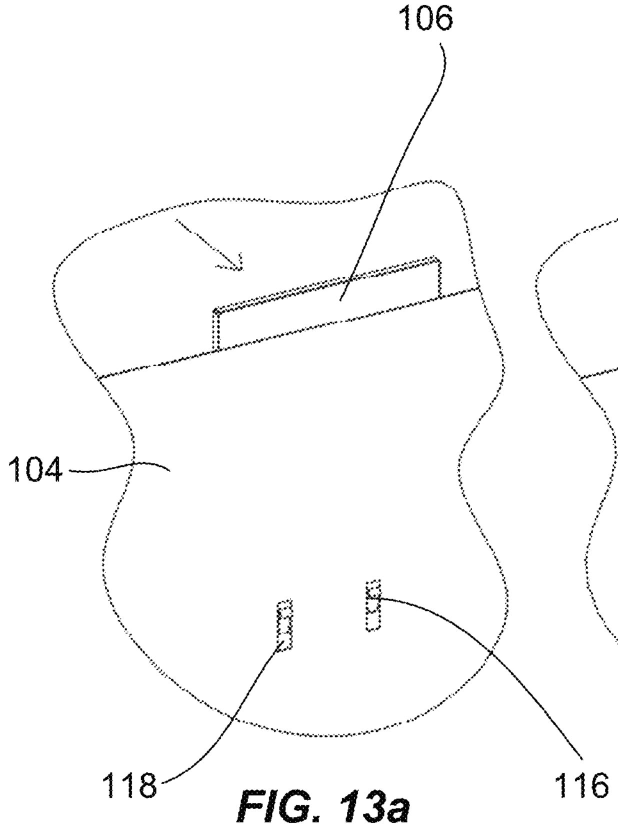
FIGS. 13*a* and 13*b* show a detailed view of the mechanical coupling between the elevator cab wall and the elevator car operating panel of the example of FIGS. 12*a* and 12*b.*
Figure 13B:
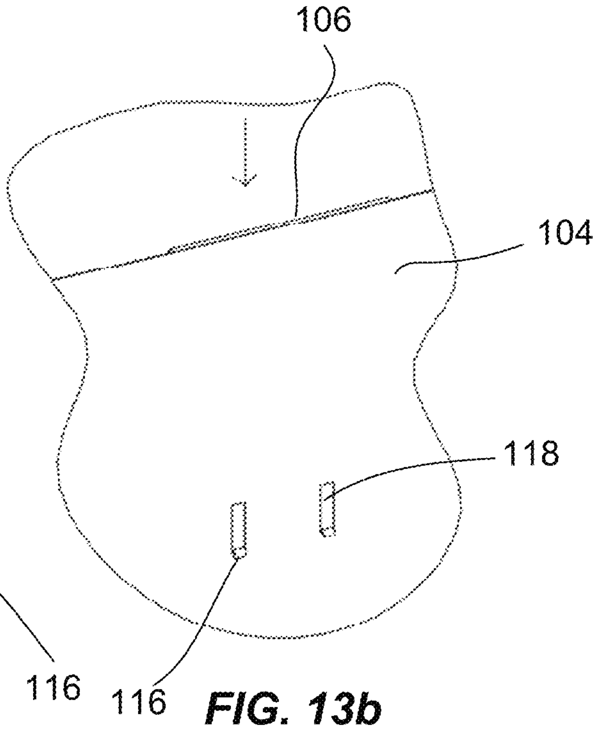

The alternative mechanical coupling 116 and corresponding coupling 118 are illustrated in further detail in FIGS. 13*a* and 13*b*. In this example, the mechanical coupling 116 includes first and second spaced apart hooks extending from the rear surface of the elevator car operating panel 106. The elevator cab wall 104 includes the corresponding coupling 118, which includes first and second spaced apart slots or apertures. The first and second hooks are configured to engage a lower edge of a corresponding slot or aperture, to thereby hang the elevator car operating panel 106 onto the elevator cab wall 104.

As shown in FIG. 13*a*, during installation the elevator car operating panel 106 is first positioned with respect to the elevator cab wall 104 such that the first and second hooks slot into an upper region of the corresponding first and second slots or apertures. The elevator car operating panel 106 is then pushed in a generally downward direction until the first and second hooks engage with the lower edge of the first and second slots or apertures.

In this example, as shown in FIG. 12*b* the configuration of the electrical coupling is reversed compared to the example of FIG. 8*b*. That is, the first connector portion 112 is a female connector portion including a pin contact 130 and the second connector portion 114 is a male connector portion including a receptacle contact 128. In order to allow for the elevator car operating panel 106 to be mounted to the elevator cab wall 104 via the first and second hooks and slots, the first and second connector portions 112, 114 are configured to form a sliding electrical connection. That is, the first connector portion 112 is configured to slide relative to the second connector portion 114 whilst maintaining electrical connection between the pin contact 130 and the receptacle contact 128. For example, the first connector portion 112 and the second connector portion may be elongated in the vertical direction such that the first connector portion 112 may be located over the second connector portion 114 and is configured to slide over the second connector portion 114 as the elevator car operating panel 106 is pushed downwardly to engage the first and second hooks with the lower edge of the first and second slots or apertures. In this way, the first and second connector portions 112, 114 may form an electrical connection by a push fit and slide action.

The elevator car operating panel 106 may additionally be fixed into the elevator cab wall 104 using one or more securing elements as described above.

It will be appreciated that any of the example elevator car assemblies described herein may include one or more elevator car operating panels according to any of the examples described herein secured to one or more of the elevator cab walls. In the elevator cab of an elevator car assembly including a plurality of elevator car operating panels, each elevator car operating panel may include a user interface having the same or different elevator controls as the other elevator car operating panel(s).

It will be appreciated that any of the elevator car operating panels described herein may include a plurality of electrical connections and a plurality of data connections. The data connection may be configured similarly to any of the electrical connections described herein. It will also be appreciated that a single first and second connector portion may simultaneously provide both an electrical connection and a data connection.

Whilst in some of the examples described herein, the first connector portion is provided at an upper edge of the elevator car operating panel, it will be appreciated that the position of the first connector portion may be on any portion of the rear surface of the elevator car operating panel and is not restricted to the upper edge. Similarly, the second connector portion may be positioned on any portion of the elevator cab wall to correspond to the position of the first connector portion on the elevator car operating panel.

Various examples described herein advantageously provide an elevator car operating panel that can be relatively easily installed, removed, and replaced, thereby forming a "plug and play" type interface between the elevator car operating panel and the elevator cab. The elevator car operating panel can be delivered as a stand-alone item without the need to wire multiple cables and without the need for any specific tooling.

The elevator car operating panel described herein enables simple replacement of the elevator car operating panel, for example allowing various aesthetic updates to the elevator cab without the need for specific maintenance personnel to carry out the update. The elevator car operating panel described herein thereby allows for more time efficient elevator cab updates and aesthetic refresh than prior art elevator car operating panels.

The easily replaceable elevator car operating panel described herein further simplifies maintenance and troubleshooting procedures since the elevator car operating panel can be quickly replaced with a temporary elevator car operating panel whilst the original elevator car operating panel is being serviced, maintained or repaired. This enables the elevator to continue operating during repair of the elevator car operating panel, thereby minimizing inconvenience to users.

The elevator car operating panel as described herein is more field friendly since change of the elevator car operating panel can be carried out entirely from within the elevator cab. There is no need for maintenance personnel to go on top of the elevator car or on a working platform in order to connect or disconnect wiring from the elevator car operating panel.

It will be appreciated by those skilled in the art that the disclosure has been illustrated by describing one or more examples thereof, but is not limited to these examples; many variations and modifications are possible, within the scope of the accompanying claims.

What is claimed is:

1. An elevator car assembly (100) comprising:

an elevator car operating panel (106) comprising a user interface (124) on a front surface (108) and a first connector portion (112) on a rear surface (110); and an elevator cab (102) comprising a plurality of walls (104) comprising at least one elevator cab wall (104) for mounting the elevator car operating panel (106) thereon, the at least one elevator cab wall (104) comprising a second connector portion (114);

wherein the first connector portion (112) is configured to form a releasable electrical connection with the second connector portion (114);

wherein the elevator car operating panel (106) comprises a mechanical coupling (116) configured to releasably couple with a corresponding coupling (118) on the at least one elevator cab wall (104);

wherein the mechanical coupling (116) comprises a first part of a hinge mechanism, and the corresponding coupling comprises a second part of a hinge mechanism, wherein the first part of the hinge mechanism is configured to cooperate with the second part of the hinge mechanism such that the elevator car operating panel (106) hinges with respect to the at least one elevator cab wall (104).

2. The elevator car assembly (100) according to claim 1, wherein one of the first and second connector portion (112, 114) is a male connector portion and the other of the first and second connector portion (112, 114) is a female connector portion.

3. The elevator car assembly (100) according to claim 1, wherein the first connector portion (112) is configured for insertion into the second connector portion (114).

4. The elevator car assembly (100) according to claim 1, wherein the first connector portion (112) comprises at least one pin contact (130) and the second connector portion (114) comprises at least one receptacle contact (128) configured to cooperate with the at least one pin contact (130), or wherein the first connector portion (112) comprises at least one receptacle contact (128) and the second connector portion (114) comprises at least one pin contact (130) configured to cooperate with the at least one receptacle contact (128).

5. The elevator car assembly (100) according to claim 1, wherein the first connector portion (112) and the second connector portion (114) are configured to push fit together.

6. The elevator car assembly (100) according to claim 1, wherein the first connector portion (112) is further configured to form a releasable data connection with the second connector portion (114).

7. The elevator car assembly (100) according to claim 1, wherein the elevator car operating panel (106) comprises a printed circuit board between the front surface (108) and the rear surface (110), and the first connector portion (112) is electrically coupled to the printed circuit board.

8. The elevator car assembly (100) according to claim 1, wherein the second connector portion (114) is electrically coupled to circuitry on the elevator cab (102).

9. The elevator car assembly (100) according to claim 1, wherein the elevator car operating panel (106) is configured for releasably mounting onto the at least one elevator cab wall (104).

10. The elevator car assembly (100) according to claim 1, further comprising at least one securing element configured to secure the elevator car operating panel (106) in a mounted position with respect to the at least one elevator cab wall (104).

11. The elevator car assembly (100) according to claim 1, wherein the user interface (124) comprises at least one elevator control comprising at least one of a switch, a button, and a display, each accessible through or disposed upon the front surface (108) of the elevator car operating panel (106).

12. An elevator cab (102) comprising:

a plurality of elevator cab walls (104) comprising at least one elevator cab wall (104) for mounting an elevator car operating panel (106) thereon, the at least one elevator cab wall (104) comprising a second connector portion (114);

wherein the second connector portion (114) is configured to form a releasable electrical connection with a first connector portion (112) provided on a rear surface (110) of the elevator car operating panel (106);

wherein the elevator car operating panel (106) comprises a mechanical coupling (116) configured to releasably couple with a corresponding coupling (118) on the at least one elevator cab wall (104);

wherein the mechanical coupling (116) comprises a first part of a hinge mechanism, and the corresponding coupling comprises a second part of a hinge mechanism, wherein the first part of the hinge mechanism is configured to cooperate with the second part of the hinge mechanism such that the elevator car operating panel (106) hinges with respect to the at least one elevator cab wall (104).

13. An elevator car operating panel (106) comprising:

a user interface (124) on a front surface (108) of the elevator car operating panel (106) and a first connector portion (112) on a rear surface (110) of the elevator car operating panel (106);

wherein the first connector portion (112) is configured to form a releasable electrical connection with a second connector portion (114) provided on at least one wall (104) of an elevator cab (102);

wherein the elevator car operating panel (106) comprises a mechanical coupling (116) configured to releasably couple with a corresponding coupling (118) on the at least one elevator cab wall (104);

wherein the mechanical coupling (116) comprises a first part of a hinge mechanism, and the corresponding coupling comprises a second part of a hinge mechanism, wherein the first part of the hinge mechanism is configured to cooperate with the second part of the hinge mechanism such that the elevator car operating panel (106) hinges with respect to the at least one elevator cab wall (104).

* * * * *